(12) United States Patent  
Vis et al.

(10) Patent No.: US 9,046,377 B2
(45) Date of Patent: Jun. 2, 2015

(54) METHOD AND SYSTEM FOR GENERATING FIXED TRANSIT ROUTES

(71) Applicant: TRAPEZE SOFTWARE INC., Mississauga (CA)

(72) Inventors: Roelof Vis, Eastern Passage (CA); Bradley Todd Heide, Belfountain (CA)

(73) Assignee: Trapeze Software Inc., Mississauga (CA)

( * ) Notice: Subject to any disclaimer, the term of this patent is extended or adjusted under 35 U.S.C. 154(b) by 0 days.

(21) Appl. No.: 14/081,628

(22) Filed: Nov. 15, 2013

(65) Prior Publication Data

US 2014/0074400 A1 Mar. 13, 2014

Related U.S. Application Data

(63) Continuation of application No. 13/210,419, filed on Aug. 16, 2011, now Pat. No. 8,589,074.

(30) Foreign Application Priority Data

Aug. 15, 2011 (CA) ..................................... 2749016

(51) Int. Cl.
*G01C 21/34* (2006.01)
*G06Q 10/04* (2012.01)
*G06Q 10/08* (2012.01)

(52) U.S. Cl.
CPC ............ *G01C 21/3407* (2013.01); *G06Q 10/04* (2013.01); *G06Q 10/08* (2013.01)

(58) Field of Classification Search
USPC ......... 701/201, 202, 206, 209, 210, 224, 400, 701/527; 340/994, 995.1, 995.2, 995.14, 340/995.18, 995.19, 995.21, 995.23
See application file for complete search history.

(56) References Cited

U.S. PATENT DOCUMENTS

| 7,391,341 B2* | 6/2008 | Keaveny et al. ............... 340/994 |
| 8,165,793 B1* | 4/2012 | Pylant ........................... 701/467 |
| 2007/0185649 A1 | 8/2007 | Geilich |
| 2010/0082235 A1 | 4/2010 | Dicke et al. |
| 2010/0153007 A1 | 6/2010 | Crowley |
| 2011/0160995 A1 | 6/2011 | Geilich et al. |

* cited by examiner

*Primary Examiner* — Mary Cheung
*Assistant Examiner* — Rodney Butler
(74) *Attorney, Agent, or Firm* — McMillan LLP

(57) ABSTRACT

A method and system for generating fixed transit routes is provided. A first set of street network segments within a first threshold distance from a starting point is identified for a pattern inputted by a user. A proxy first point along each of the street network segments in the first set is also identified. A second set of street network segments within a second threshold distance from an ending point is identified for the pattern inputted by the user. A proxy second point along each of the street network segments in the second set is also identified. A best path for the pattern is determined including any one of the proxy first points along the street network segments in the first set and any one of the proxy second points along the street network segments in the second set.

12 Claims, 9 Drawing Sheets

METHOD AND SYSTEM FOR GENERATING FIXED TRANSIT ROUTES

FIELD OF THE INVENTION

The present invention relates generally to transit. In particular, the invention relates to a method and system for generating fixed transit routes.

BACKGROUND OF THE INVENTION

Fixed-route transit is known. A set of fixed transit routes is established for a geographic area, and a schedule is set for each. The fixed transit routes and the schedules can be selected based on many factors, including population and ridership distribution, street route suitability and safety, employment centers, etc. Fixed route transit is typically subsidized by metropolitan, state/provincial and/or federal government. As a result, it is desirable to provide such fixed-route transit services as efficiently as possible.

Some transit organizations that provide fixed-route transit services review and modify their fixed transit routes frequently. These changes may be made in response to changes in ridership along the current routes, changing population distributions, changes in available funding, changes in the availability of vehicles and/or operators, school and university calendar changes, etc. When such transit organizations modify their fixed transit routes, they typically re-generate a transit route map by hand. The transit route map is generated by tracing each fixed transit route over a street network map. Each fixed transit route can include a number of patterns. Patterns are the paths followed by a vehicle from one end of a route to another end. The outgoing trip in one direction is generally treated as a separate pattern from the incoming trip along the other direction for a fixed transit route. Each of these two patterns has timing information for stops along the route. Further, the vehicle path may be altered during some periods of the day or on weekends. For example, a vehicle may be diverted away from a busy intersection during rush hour. A separate pattern is defined to demarcate the new path taken by the vehicle. Each pattern must be traced for a fixed transit route. The process of tracing each of the patterns of each fixed transit route for a transit network can take a significant amount of time, weeks in many cases.

Currently, computer systems exist for generating transit route maps. Such computer systems present a street map to a user to enable the user to input patterns that make up the fixed transit routes. Each pattern is inputted by a user by marking on the street map the starting and ending points of the pattern and, optionally, a number of intermediate points along the pattern. The computer system then determines a path between the points defined by the user using a street routing algorithm and a street network database. The street network database stores street network segments. Each street network segment represents a stretch of road between points at which more than one path is available (i.e., an intersection). The street routing algorithm creates projections by linking street network segments.

The street routing algorithm requires a starting point and an ending point to generate a pattern along a street network. The computer system maps the starting point and ending point for a pattern provided by a user onto a street network in order to determine these inputs for the street routing algorithm. In particular, the computer system maps the starting point and ending point inputted by the user by determining the closest street network segments to each. In the case where two or more street network segments are equidistant to the starting or ending point, one of the street network segments is selected randomly. If the selected street network segment adjacent the starting point is a one-way street, the start of the pattern generated by the street routing algorithm may travel further away from the ending point. Similarly, if the selected street network segment adjacent the ending point is a one-way street, the end of the pattern generated by the street routing algorithm may overshoot the ending point before returning to it. Even if the selected adjacent street network segment is not one-way, it may yield a less-than-desirable route.

It can be desirable to generate fixed transit routes that have expected travel times of a certain length or less in some cases. By providing service whereby vehicles are expected to depart at the same number of minutes past the hour for each hour for periods, or all, of the day, clients can more easily plan their trips using the fixed-route transit service. In such cases, there is benefit to having the expected round trip time for a vehicle to perform the fixed transit route be under an hour. If the expected travel time for a vehicle to perform the fixed transit route exceeds an hour, another vehicle and driver need to be deployed along the route to adhere to the desired schedule. Thus, by determining better paths for fixed transit routes, both equipment and personnel costs can be kept down.

It is therefore an object of the invention to provide a novel method and system for generating fixed transit routes.

SUMMARY OF THE INVENTION

According to an aspect of the invention, there is provided a method for generating fixed transit routes, comprising:

identifying a first set of street network segments within a first threshold distance from a first point for a pattern inputted by a user, and a proxy first point along each of said street network segments in said first set;

identifying a second set of street network segments within a second threshold distance from a second point for said pattern inputted by said user, and a proxy second point along each of said street network segments in said second set; and determining a best path for said pattern including any one of said proxy first points along said street network segments in said first set and any one of said proxy second points along said street network segments in said second set.

The identifying said first set can include:

determining a shortest distance from said first point to any one of said street network segments adjacent said first point; and determining said first threshold distance as a multiple of said shortest distance.

The identifying said first set can further include setting said shortest distance to a minimum threshold if said shortest distance is below said minimum threshold.

The identifying said second set can include:

determining a shortest distance from said second point to any of said street network segments adjacent said second point; and determining said second threshold distance as a multiple of said shortest distance.

The identifying said second set can further include setting said shortest distance to a minimum threshold if said shortest distance is below said minimum threshold.

The method can further include iteratively performing said identifying of said first and second sets and said determining for pairs of points along said pattern, said pairs defining pattern sections. The method can still further include connecting said pattern sections to form said pattern.

The determining can include:

creating temporary network segments from said first point to each of said proxy first points along said street network segments in said first set, and from said second point to each of said proxy second points along said street network segments in said second set;

determining said best path from said first point and along any one of said temporary network segments to said proxy first points along said street network segments in said first set to said second point via any one of said temporary network segments to said proxy second points along said street network segments in said second set.

The method can further include storing a portion of said best path from said proxy first point adjacent said first point to said proxy second point adjacent said second point.

According to another aspect of the invention, there is provided a computer system for generating fixed transit routes, comprising:

computer-executable instructions executed by a processor identifying a first set of street network segments within a first threshold distance from a first point for a pattern inputted by a user and a proxy first point along each of said street network segments in said first set, identifying a second set of street network segments within a second threshold distance from a second point for said pattern inputted by said user and a proxy second point along each of said street network segments in said second set, and determining a best path for said pattern including any one of said proxy first points along said street network segments in said first set and any one of said proxy second points along said street network segments in said second set.

According to a further aspect of the invention, there is provided a computer-readable medium having stored thereon computer-executable instructions implementing an application for generating fixed transit routes, said application identifying a first set of street network segments within a first threshold distance from a first point for a pattern inputted by a user, and a proxy first point along each of said street network segments in said first set, identifying a second set of street network segments within a second threshold distance from a second point for said pattern inputted by said user, and a proxy second point along each of said street network segments in said second set, and determining a best path for said pattern including any one of said proxy first points along said street network segments in said first set and any one of said proxy second points along said street network segments in said second set.

BRIEF DESCRIPTION OF THE DRAWINGS

Embodiments will now be described, by way of example only, with reference to the attached Figures, wherein.

DETAILED DESCRIPTION OF THE EMBODIMENTS

Figure 1:
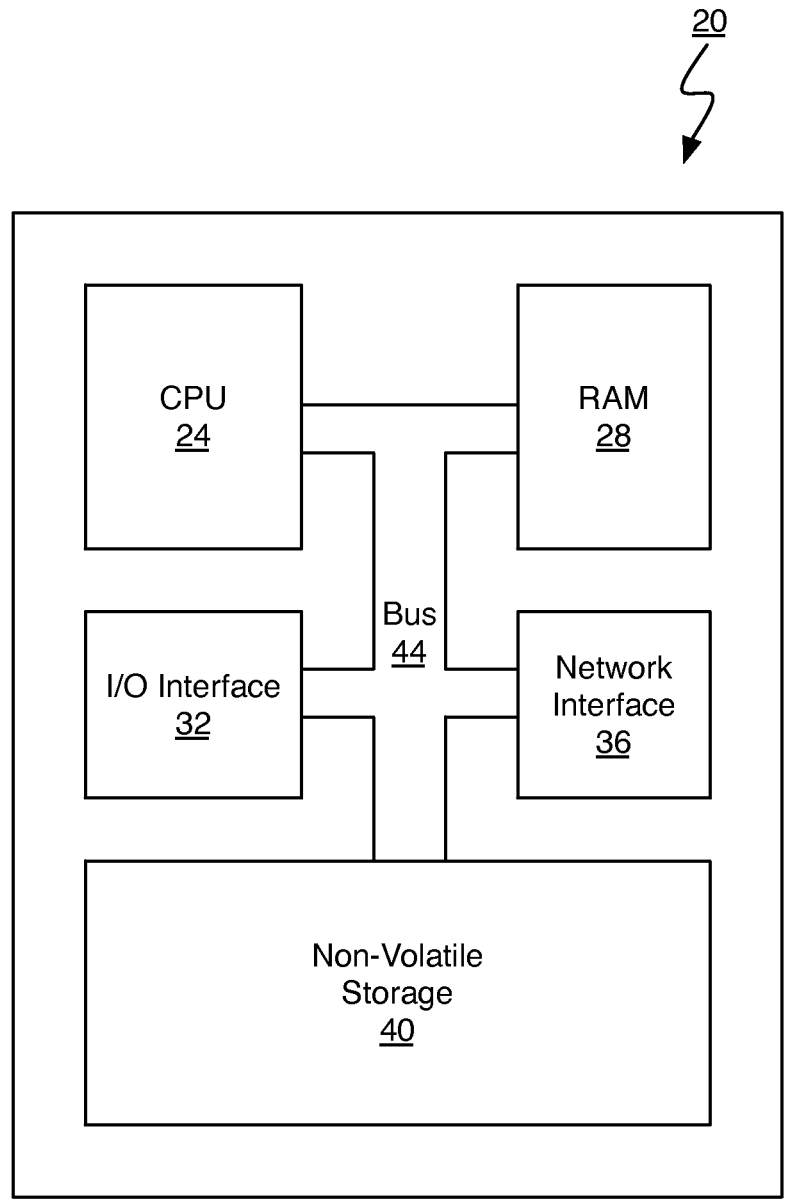
FIG. 1 is a schematic diagram of a computer system for generating fixed transit routes in accordance with an embodiment of the invention.

A computer system 20 for generating fixed transit routes in accordance with an embodiment of the invention is shown in FIG. 1. As shown, the computer system 20 has a number of physical and logical components, including a central processing unit ("CPU") 24, random access memory ("RAM") 28, an input/output ("I/O") interface 32, a network interface 36, non-volatile storage 40, and a local bus 44 enabling the CPU 24 to communicate with the other components. The CPU 24 executes an operating system, a fixed transit route-generating application. RAM 28 provides relatively-responsive volatile storage to the CPU 24. The I/O interface 32 allows for input to be received from one or more devices, such as a keyboard, a mouse, etc., and outputs information to output devices, such as a display and/or speakers. The network interface 36 permits communication with other systems. Non-volatile storage 40 stores the operating system and programs, including computer-executable instructions for implementing the fixed transit route-generating application. Additionally, the non-volatile storage 40 stores a street network database and fixed transit routes generated by the fixed transit route-generating application. During operation of the computer system 20, the operating system, the programs and the data may be retrieved from the non-volatile storage 40 and placed in RAM 28 to facilitate execution.

The street network database stored in non-volatile storage 40 stores information about a set of street network segments for one or more geographic areas. Each street network segment represents a stretch of road in a particular direction between points at which more than one path is available (i.e., an intersection). Thus, a stretch of road between two intersections along which travel is permitted in two directions is represented with two street network segments, one in each direction. The street network database also stores information about the length of and travel time data for each street network segment. Further, the street network database stores information regarding permissible and/or impermissible transfers from one street network segment to an adjacent one. An example of this is times of day that a left turn is permissible and impermissible at an intersection.

When fixed transit routes have to be generated, a user inputs data for each pattern that makes up the fixed transit route. Each fixed route typically includes two or more patterns. Patterns are the paths followed by a vehicle from one end of a route (i.e., a starting point) to another end (i.e., an ending point). The outgoing trip in one direction is generally treated as a separate pattern from the incoming trip along the other direction for a fixed route. Further, different patterns can be defined for a fixed transit route for different periods of a day, or different days. During heavier periods of traffic and/or passenger loads, a different pattern, or path, may be defined for a route. For example, a pattern may be defined for a fixed transit route to avoid an intersection that becomes very slow during rush hour. Also, a pattern may be defined to provide express service from a service area of a fixed transit route that is more remote from an urban center. All of these patterns are defined in order to define the fixed transit route. Each pattern has timing information for stops along the route relative to the starting time for the pattern.

In order to define a pattern, a user identifies a starting point, an ending point and, optionally, one or more intermediate points. This is enabled by a marking module of the fixed transit route-generating application. The marking module enables the user to input these points by manually marking them on a street map presented on a display. The geolocation of each of the manually-entered points is determined in order to store the points identified by the user. The marking may be done using a mouse pointer and clicking on the street map, but can also be done in various other manners, such as via touching a touch screen. Alternatively, instead of manually entering the points on a map, the geolocation for each point can be entered by the user as a set of coordinates, such as latitude and longitude.

Figure 2:
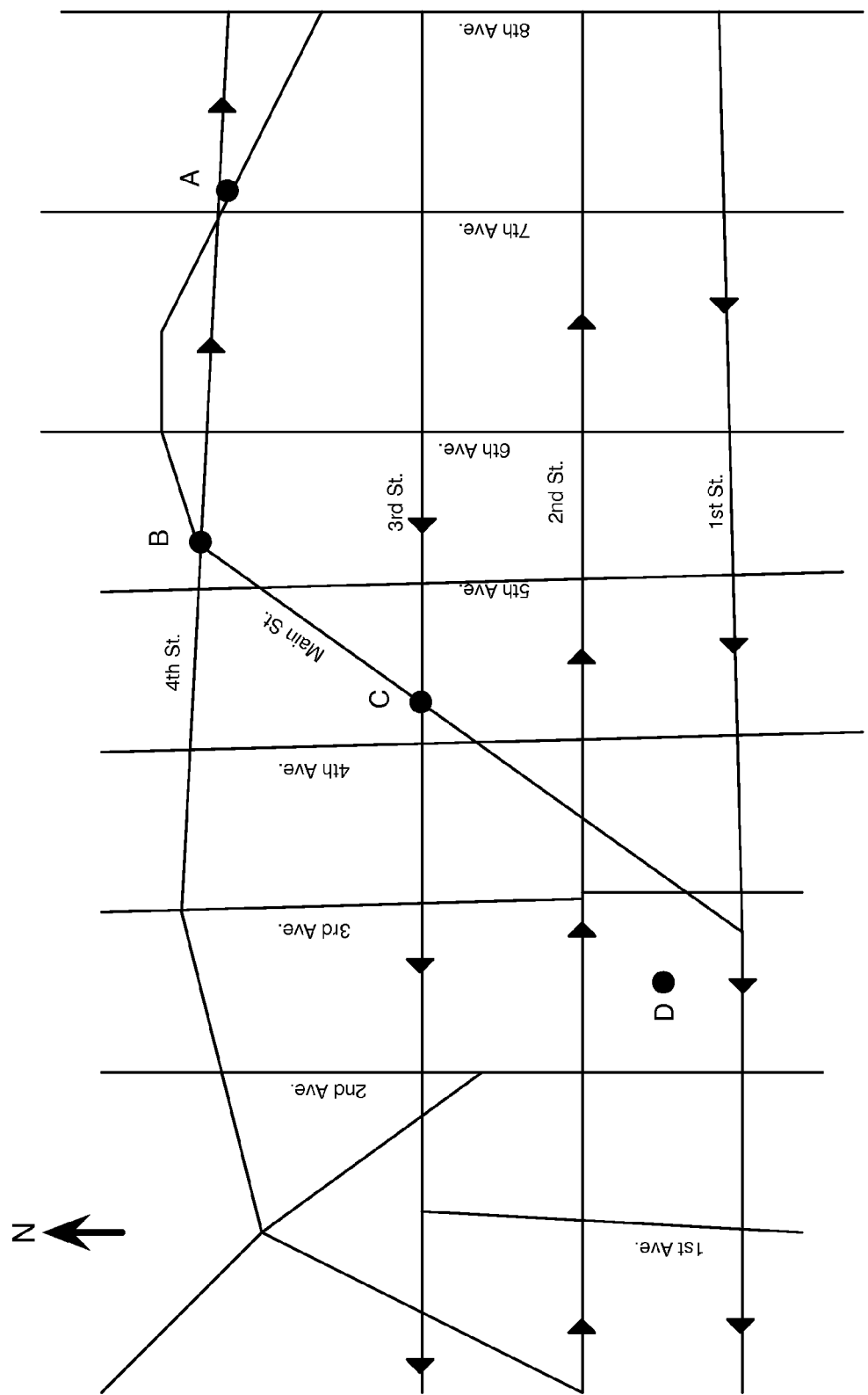
FIG. 2 shows a street network having a set of locations inputted by a user for defining a pattern of a fixed transit route.

FIG. 2 shows a set of points having been identified for a pattern on a street map. The street map in this case includes a number of one-way streets, marked with directional arrowheads. A starting point, labeled A, is shown adjacent an intersection. Two intermediate points, B and C, have been inputted to identify a general path that the pattern is to follow. An ending point, labeled D, is also shown. As can be seen, the ending point D lies in the middle of a block, not being immediately adjacent to any street network segment. As will be understood, once entered, the points can be deleted, moved, etc.

Upon entry and approval of the points for a pattern by a user, the marking module saves the points for the pattern in non-volatile storage 40. These points can then be used as a template for a similar pattern, such as for an alternate pattern for the same fixed transit route. The association of the pattern with a particular fixed transit route is also saved.

The user identifies starting and ending points, together with any intermediate points, for each pattern for each fixed transit route in this manner. Once this has been done for all of the patterns of the fixed transit routes, the process of generating the fixed transit routes can be commenced by the user.

If street network segments are selected for the start and end of a section of a pattern solely based on proximity to the points at the ends of the section, and if street network segments are randomly selected where there is a tie in proximity, the path determined for a pattern section and, thus, pattern and fixed transit route and can be less-than-desirable.

Figure 3:
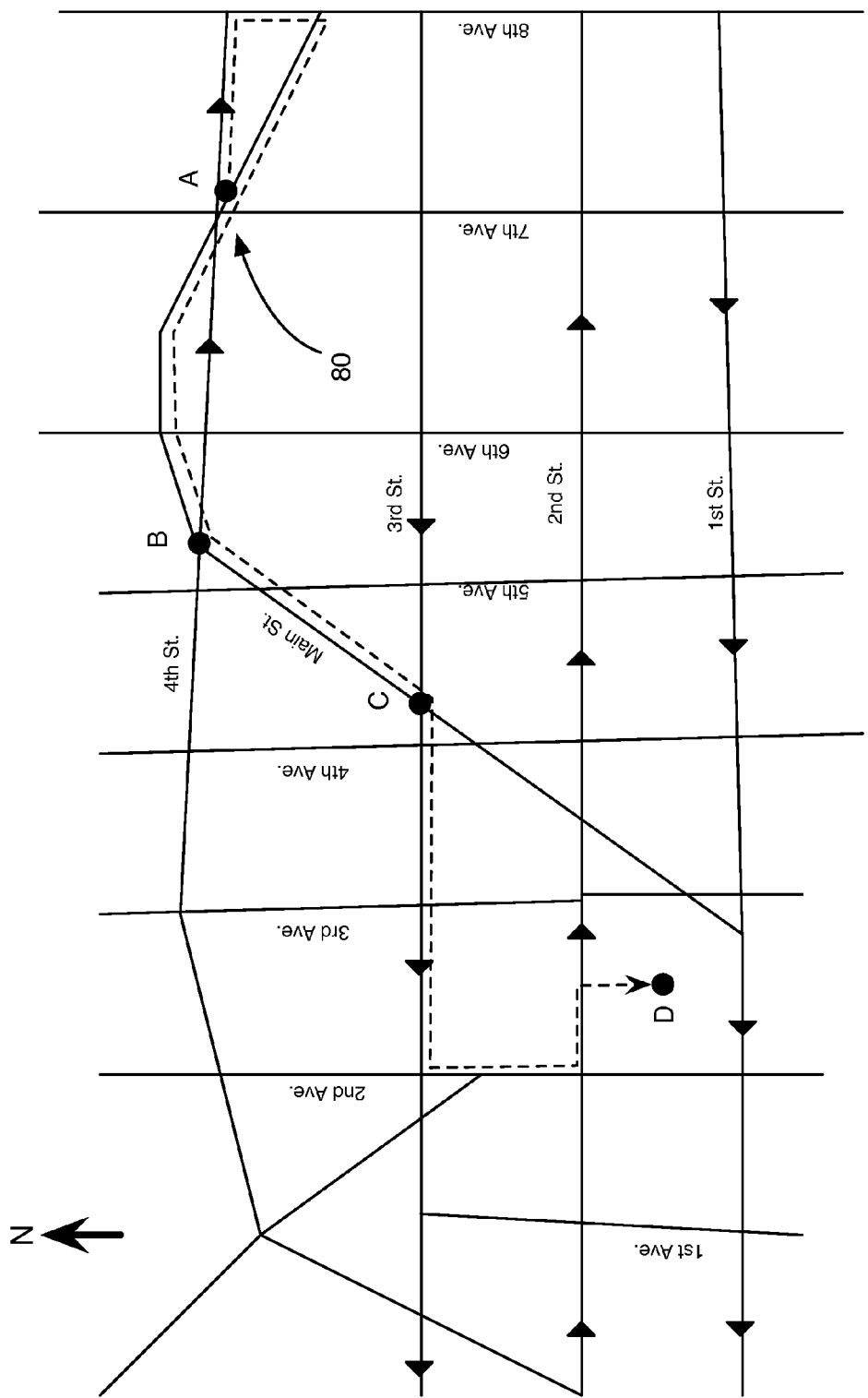
FIG. 3 shows the street network of FIG. 2 having a path determined for the pattern using the approach of the prior art.

FIG. 3 shows such a resulting path 80 for the pattern of FIG. 2. In this case, if 4$^{th}$ Street, a one-way street, is deemed to be closest to the starting point A and is selected for generating the path, the pattern may veer away from the destination, D. Further, if 2$^{nd}$ Street, another one-way street, is deemed to be the closest to the ending point D and is selected for generating the path, the pattern may travel a longer path than necessary.

Figure 4:
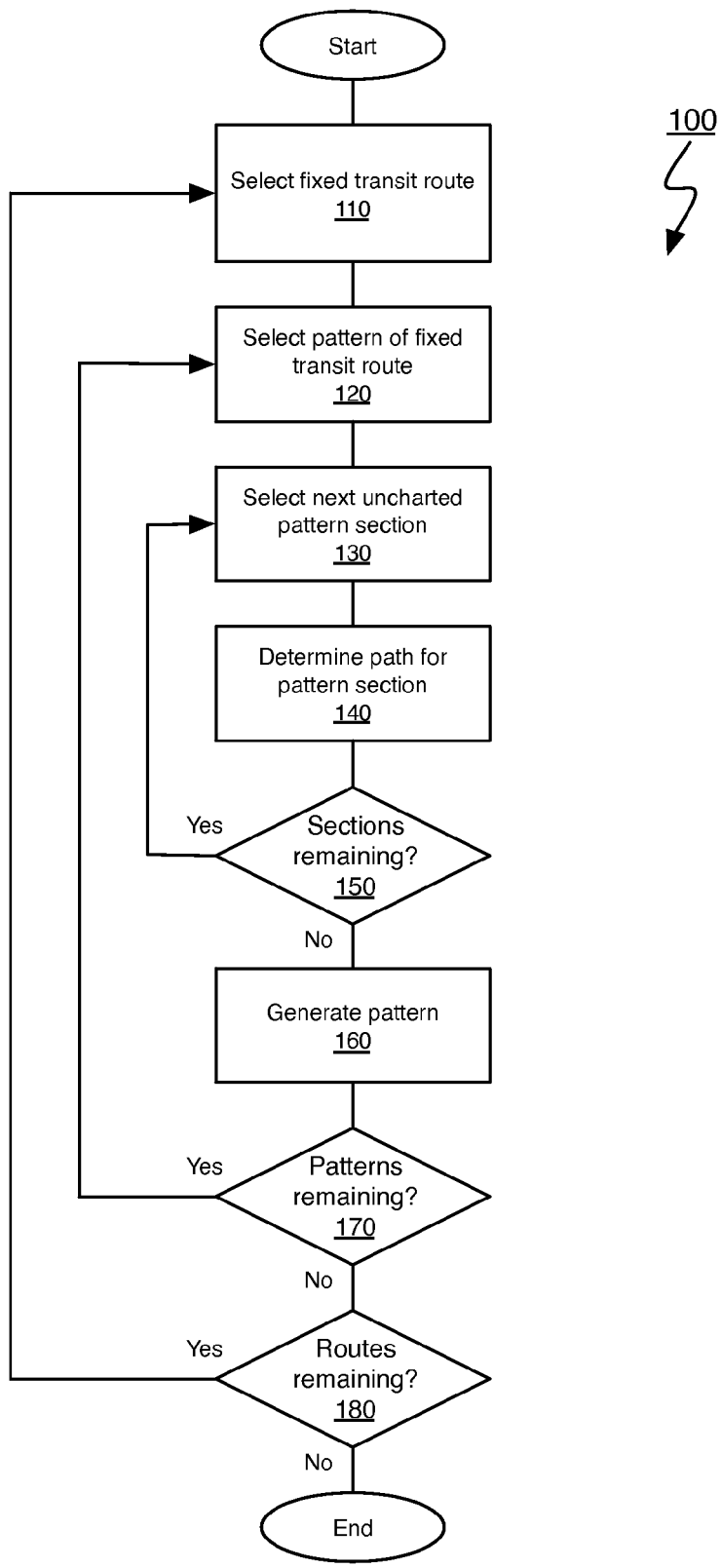
FIG. 4 is a flow chart of the general method of generating fixed transit routes using the computer system of FIG. 1.

FIG. 4 shows the method of generating fixed transit routes using the computer system 20 of FIG. 1 generally at 100. In the method 100, the fixed route-mapping application determines sets of street network segments within a threshold distance from the end points of sections of a pattern inputted by a user. A pattern can be one section or divided into two or more sections. Pattern sections are demarcated by the starting, intermediate and ending points inputted by the user for the pattern. Further, for each pattern section, a proxy first point is determined along each street network segment within a threshold distance from the first point of the pattern section, and a proxy second point is determined along each street network segment within a threshold distance from the second point of the pattern section. A proxy first point is the point along a street network segment determined to be closest to the first point of a pattern section. Similarly, a proxy second point is the point along a street network segment determined to be closest to the second point of the pattern section. Once the sets of street network segments close to the end points of the pattern section and the proxy end point for each end point has been identified, the fixed transit route-generating application uses a street routing algorithm to determine the best path from the first point through the street network segments in the first set and the street network segments in the second set, to the second point. This is iteratively performed for each section of each pattern of each fixed transit route.

The method 100 commences with the selection of a fixed transit route (110). The fixed transit route-generating application retrieves all of the data for all of the patterns for a fixed transit route from non-volatile storage. Then, a pattern of the selected fixed transit route is selected (120). Next, a next uncharted pattern section is selected (130). A section between two sequential points inputted for the pattern that has not yet been examined is chosen. The sections of the pattern are selected in the order of travel of the pattern. That is, the pattern section between the starting point and the intermediate point next along the pattern from the starting point is selected first, with subsequent sections being selected thereafter. Thus, for the pattern illustrated in FIG. 2, the pattern is divided into three sections (A-B, B-C and C-D), and the section between the starting point A and the intermediate point B is the first selected. Next, the path for the selected pattern section is determined (140).

Figure 5:
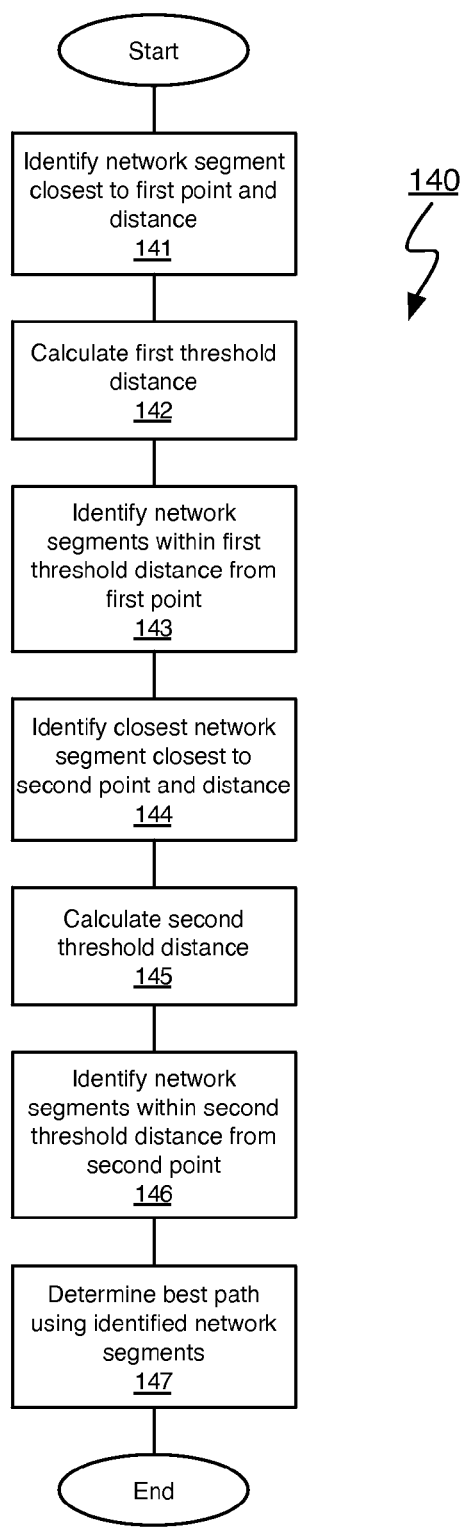
FIG. 5 is a flow chart of the process for determining a path for a pattern section in the method of FIG. 4.

FIG. 5 shows the method 140 of determining the path for the selected pattern section in greater detail. First, the fixed transit route-generating application identifies the street network segment closest to the first point of the selected pattern section (141). The street network segment closest to the first end point (or "first point") and the distance thereto are determined for the pattern section. The fixed transit route-generating application reads the geolocation coordinates for the first point and identifies street network segments in the street network database that are relatively close to the first point. Each of these street network segments is then examined to determine the shortest distance between it and the first point. Additionally, for each of these street network segments, the point along its length closest to the first point (i.e., the proxy first point) is registered. The fixed transit route-generating application identifies the street network segment closest to the first point based on the shortest distances calculated.

Once the street network segment closest to the first point has been identified, a first threshold distance is determined (142). The fixed transit route-generating application sets the first threshold distance as 20% larger than the shortest distance between the first point and the street network segment identified as being closest to the first point at 141. Next, the street network segments within the first threshold distance from the first point are identified (143). The fixed transit route-generating application then determines which of the street network segments are within the first threshold distance from the first point by examining the shortest distances calculated for each at 141. The set of street network segments within the first threshold distance from the first point is then stored in non-volatile storage 40, together with the proxy first point for each selected street network segment in the set.

Figure 6:
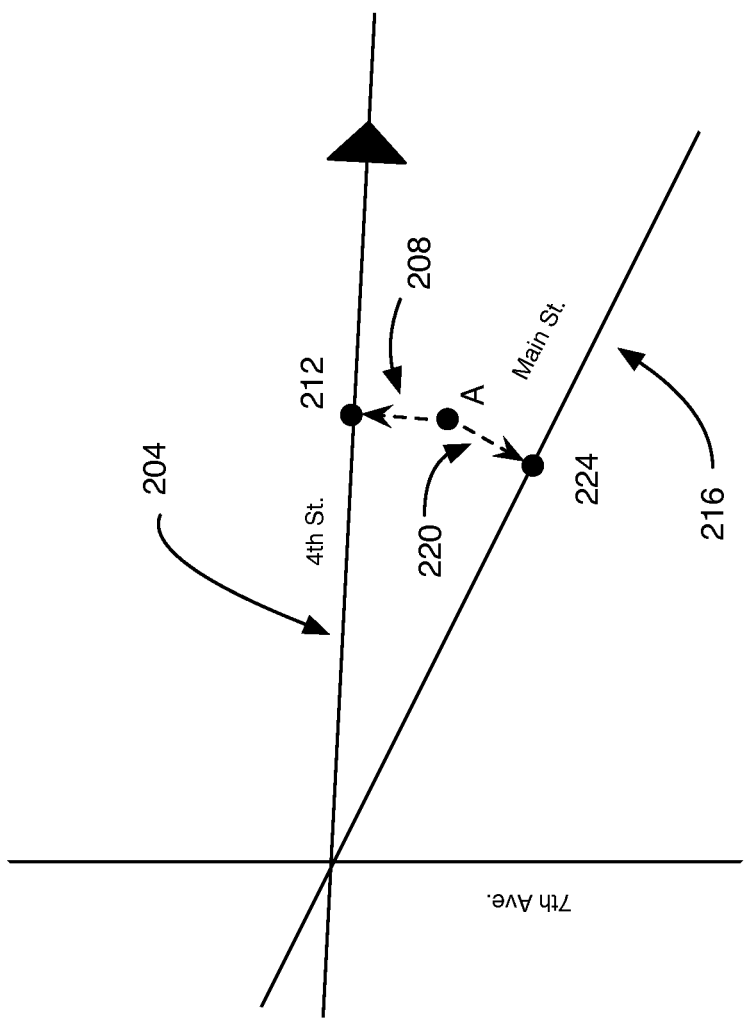
FIG. 6 shows a region of the street network around a starting point of the pattern of FIG. 2 showing the distance to adjacent street network segments.

FIG. 6 shows the region around the starting point A. The fixed transit route-generating application identifies that street network segment 204 is closest to the first point for the first pattern section, starting point A, at 141, even though street network segment 204 travels in a direction away from the second point B and ending point D. In particular, the fixed transit route-generating application determines that a proxy first point 212 along street network segment 204 is a distance 208 from the starting point A. As a result, the fixed transit route-generating application sets the first threshold distance as 20% larger than distance 208 at 142. In examining all of the relatively-close street network segments, the fixed transit route-generating application determines that two other street network segments 216 are within the first threshold distance from the starting point A at 143. Street network segments 216 include one street network segment traveling to the south-east and one traveling to the north-west. That is, distance 220 from the starting point A to a proxy first point 224 is less than or equal to 1.2 times distance 208. Thus, the set of street network segments identified at 143 include street network segment 204 and street network segments 216.

Returning again to FIG. 5, the fixed transit route-generating application then identifies the street network segment closest to the second point and the distance thereto (144). The fixed transit route-generating application reads the geolocation coordinates for the second point and identifies street network segments in the street network database that are relatively close to the second point. Each of these street network segments is then examined to determine the shortest distance between it and the second point. Additionally, for each of these street network segments, the point along its length closest to the second point (i.e., the proxy second point) is registered. The fixed transit route-generating application identifies the street network segment closest to the second point based on the shortest distances calculated.

Once the street network segment closest to the second point has been identified, the second threshold distance is determined (145). The fixed transit route-generating application sets the second threshold distance as 20% larger than the shortest distance between the second point and the street network segment identified as being closest to the second point at 144. Then, the street network segments within the second threshold distance from the second point are identified (146). The fixed transit route-generating application then determines which of the street network segments are within the second threshold distance from the second point by examining the shortest distances calculated for each at 144. The set of street network segments within the second threshold distance from the second point is then stored in non-volatile storage 40, together with the proxy second point for each street network segment in the set.

Figure 7:
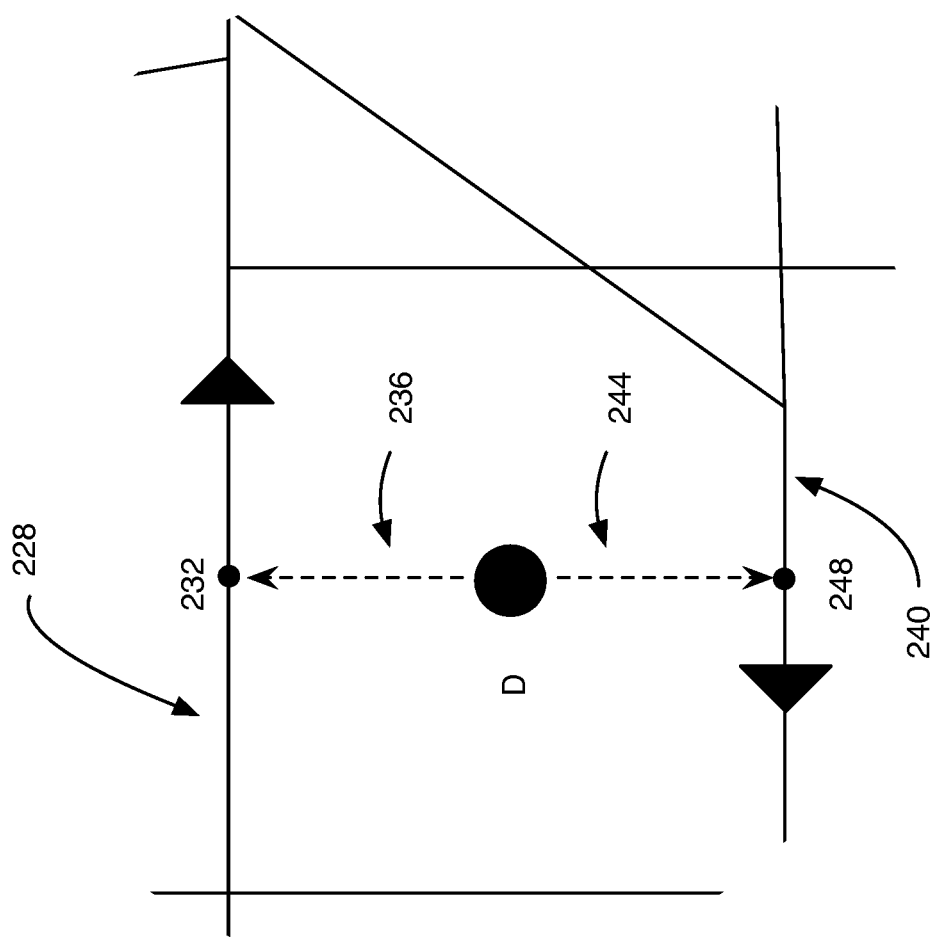
FIG. 7 illustrates a region of the street network around the ending point of the pattern of FIG. 2 showing the distance to two adjacent street network segments.

FIG. 7 shows the region around the ending point D during analysis of the last section in the pattern of FIG. 2. The fixed transit route-generating application identifies that street network segment 228 is closest to the second point, ending point D, at 144, even though street network segment 228 travels to ending point D from an opposite direction from the first point (i.e., the preceding intermediate point C). In particular, the fixed transit route-generating application determines that a proxy second point 232 along street network segment 228 is a distance 236 from the second point D. As a result, the fixed transit route-generating application sets the second threshold distance as 20% larger than distance 236. In examining all of the relatively-close street network segments, the fixed transit route-generating application determines that one other street network segment 240 is within the second threshold distance from the second point D. Street network segment 240 travels along $1^{st}$ Street, which is one-way at that point, traveling to the west. That is, distance 244 from a proxy second point 248 to the ending point D is less than or equal to 1.2 times distance 236. Thus, the set of street network segments identified at 146 for the last section of the pattern of FIG. 2 includes street network segment 228 and street network segment 240.

Returning again to FIG. 5, once the set of street network segments within the first threshold distance from the first point and the set of street network segments within the second threshold distance from the second point are determined, the best path is determined using the sets of street network segments (147). The fixed transit route-generating application uses a street routing algorithm to determine the best path. In particular, the street routing algorithm generates temporary street network segments from the first point to the proxy first point(s) and from the proxy second point(s) to the second point. Then, the street routing algorithm determines the shortest path from the first point to the second point using the temporary street network segments and the street network. The best path is selected based on the shortest time to travel from the first to the second point. The fixed transit route-generating application registers the portion of the best path that traverses the street network, together with the expected time to traverse the best path and the distance for the same. Once the best path for the selected pattern section is registered, the fixed transit route-generating application discards the temporary street network segments between the first point and the proxy first points. The temporary street network segments can be cached for determining the best path for a subsequent pattern section.

Returning again to FIG. 4, once the fixed transit route-generating application has determined and registered the path for a pattern section, it determines if there are any remaining pattern sections to be mapped for the pattern (150). If it is determined that there are sections remaining for the pattern for which the path has not been determined at 150, then the next uncharted section for the pattern is selected at 130. If, instead, it is determined that there are no remaining uncharted sections for the pattern at 150, then the pattern generated from the paths for the pattern sections (160). The fixed transit route-generating application joins together the paths for each pattern section to generate the pattern.

Next, it is determined if there are unanalyzed patterns remaining for the selected fixed transit route (170). If it is determined that there are unmapped patterns for the selected fixed transit route, another pattern for the fixed transit route is selected for mapping at 120. If, instead, it is determined that there are no remaining unmapped patterns for the selected fixed transit route at 170, the fixed transit route-generating application determines if there are any remaining fixed transit routes to be mapped (180). If it is determined that there are unmapped fixed transit routes, another fixed transit route is selected for mapping at 110. If, instead, it is determined that there are no remaining unmapped fixed transit routes at 180, the method 100 ends.

Figure 8:
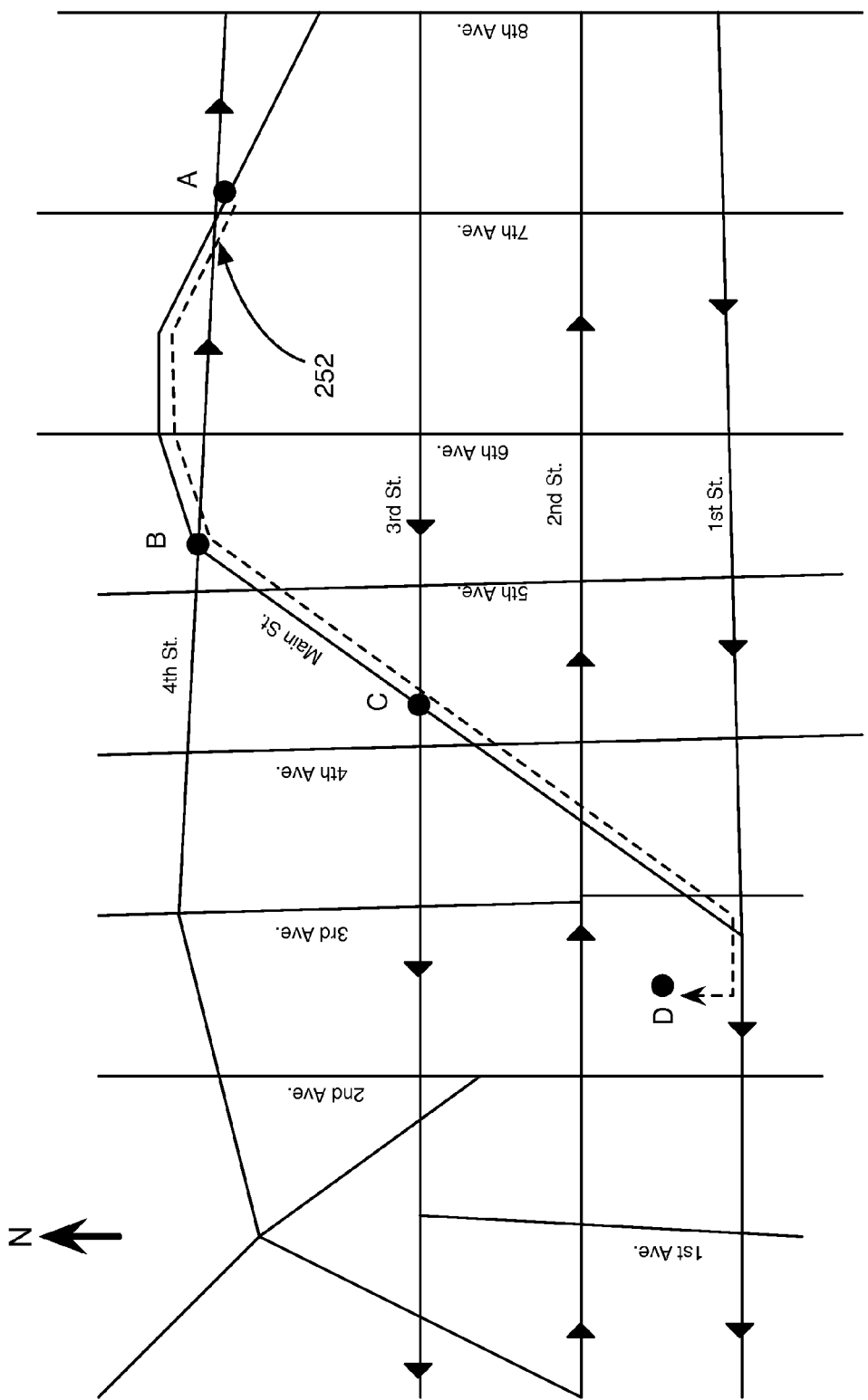
FIG. 8 shows the street network of FIG. 2 showing the best-found path for the pattern using the method of FIG. 4.

FIG. 8 shows a best-found path 252 for the pattern of FIG. 2 using the method 100.

Once the fixed transit route-generating application has determined the path for each pattern of each fixed transit route, it draws these patterns/fixed transit routes on a map for presenting to a user. The user may then manually select and modify any of the patterns/fixed transit routes generated by the fixed transit route-generating application.

In an alternative embodiment, the threshold distance for each point is determined as noted above, but is set equal to a minimum threshold distance should the calculated threshold distance be less. This can be useful, for example, where a first point is identified by a user near an intersection and may be very close to a one-way street traveling in a direction away from the second point. The minimum threshold distance may be set to, for example, 15 yards.

Figure 9:
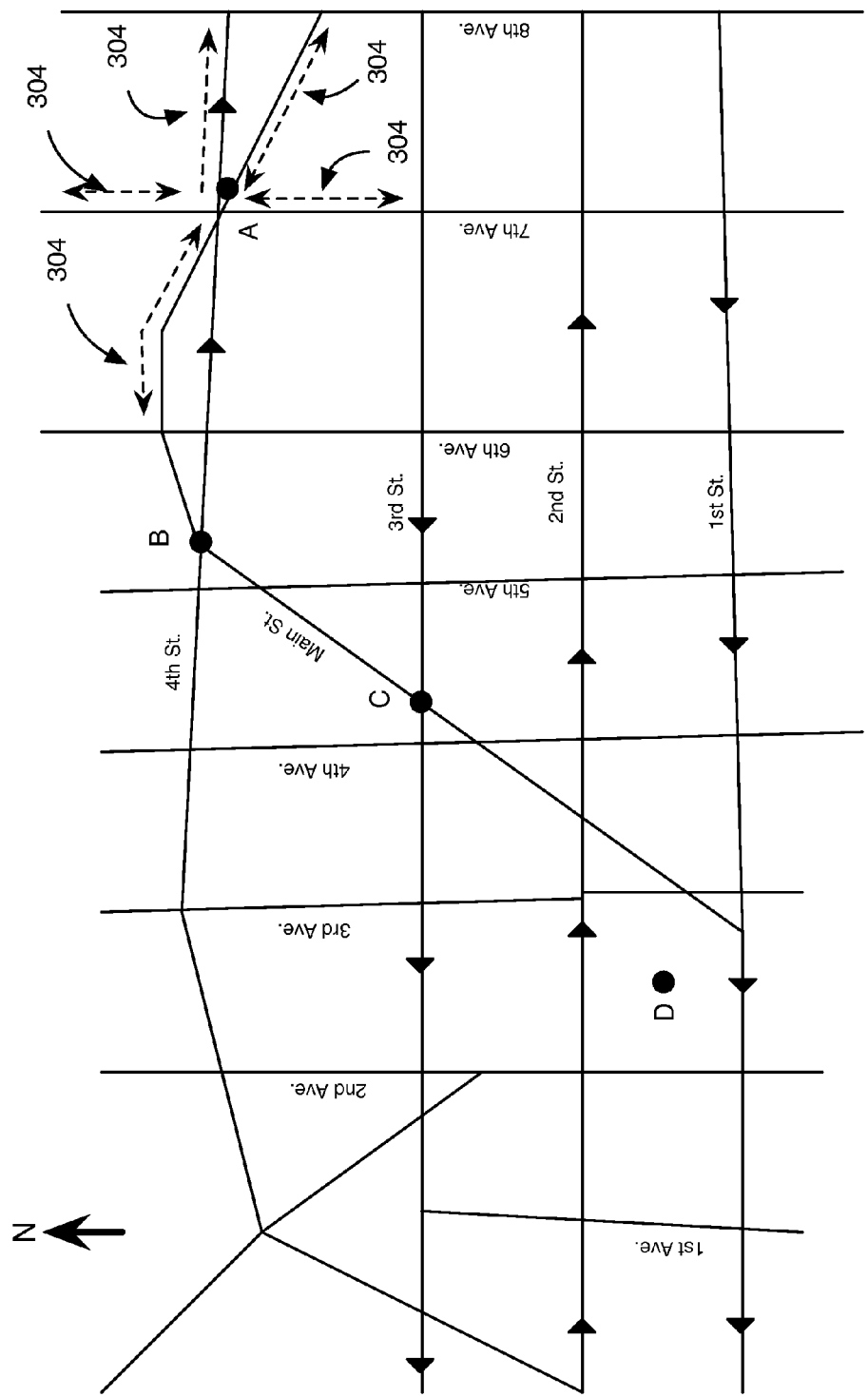
FIG. 9 shows various street network segments that may be identified as possible starting street network segments for the pattern using an alternative method.

FIG. 9 shows the street network of FIG. 2, wherein various street network segments 304 relatively close to the starting point A have been found to be within the threshold distance from the starting point A using this alternative approach.

Computer-executable instructions for implementing the fixed transit route-generating application on a computer system could be provided separately from the computer system, for example, on a computer-readable medium (such as, for example, an optical disk, a hard disk, a USB drive or a media card) or by making them available for downloading over a communications network, such as the Internet.

While the calculation of the threshold distances has been described with specificity to a few particular approaches, other approaches for calculating the threshold distances will occur to those of skill in the art. For example, the threshold distances can be determined using the distance to two or more street network segments from a first or second point. In another approach, the threshold distances can be calculated using polynomial equations.

In another embodiment, a path for a pattern section can be generated from the end of the path determined for the previous pattern section. This can provide a more rapid path determination for the pattern in some cases.

While the computer system is shown as a single physical computer, it will be appreciated that the computer system can include two or more physical computers in communication with each other. Accordingly, while the embodiment shows the various components of the computer system residing on the same physical computer, those skilled in the art will appreciate that the components can reside on separate physical computers.

One or more portions of the method may be executed by third parties. For example, the itinerary-planning system may be an external system executed on a separate computer.

The above-described embodiments are intended to be examples of the present invention and alterations and modifications may be effected thereto, by those of skill in the art, without departing from the scope of the invention that is defined solely by the claims appended hereto.

The invention claimed is:

1. A computer executable method for generating one or more patterns of fixed transit routes, where each fixed transit route comprising one or more patterns, each pattern comprising a set of sequential points, each set comprising a starting point, an ending point, and one or more intermediate points, each pattern having one or more uncharted sections, uncharted sections comprising two sequential points not having a path therebetween, the method comprising:

selecting a fixed transit route;

choosing a pattern of the fixed transit route, the pattern having at least one uncharted section;

retrieving by a computer processor all data for the pattern stored on a computer readable medium, the data including a set of sequential points;

for each uncharted section of the pattern:

identifying by a computer processor a first set of street network segments within a first threshold distance from a first pattern point of the uncharted section, and a proxy first point along each of said street network segments in said first set, said proxy first point defined as being the point on said street network segment closest to said first pattern point;

identifying by a computer processor a second set of street network segments within a second threshold distance from a second pattern point of the uncharted section, and a proxy second point along each of said street network segments in said second set, said proxy second point defined as being the point on said street network segment closest to said second pattern point; and determining by a computer processor a best path for said uncharted section including any one of said proxy first points along said street network segments in said first set and any one of said proxy second points along said street network segments in said second set.

2. The method of claim 1, wherein said identifying said first set comprises:

determining a shortest distance from said first pattern point to any one of said street network segments adjacent said first pattern point; and determining said first threshold distance as a multiple of said shortest distance.

3. The method of claim 1 further comprising:

presenting the pattern to a user for manual modification.

4. The method of claim 2, wherein determining said first threshold distance as a multiple of said shortest distance further comprises:

configuring a minimum threshold setting said shortest distance to said minimum threshold if said shortest distance is below said minimum threshold.

5. A computer executable method for generating fixed transit routes, comprising:

identifying by a computer processor a first set of street network segments within a first threshold distance from a first pattern point for a pattern inputted by a user and stored on a computer readable medium, and a proxy first point along each of said street network segments in said first set, said proxy first point defined as being the point on said street network segment closest to said first pattern point;

identifying by a computer processor a second set of street network segments within a second threshold distance from a second pattern point for said pattern inputted by said user and stored on a computer readable medium, and a proxy second point along each of said street network segments in said second set, said proxy second point defined as being the point on said street network segment closest to said second pattern point;

determining by a computer processor a best path for said pattern by determining pairs of points any one of said proxy first points along said street network segments in said first set and any one of said proxy second points along said street network segments in said second set; and, iteratively performing said identifying of said first and second sets and said determining for pairs of points along said pattern, said pairs defining pattern sections.

6. The method of claim 5, wherein said identifying said first set comprises:

determining a shortest distance from said first pattern point to any one of said street network segments adjacent said first pattern point; and determining said first threshold distance as a multiple of said shortest distance.

7. The method of claim 5, wherein said identifying said second set comprises:

determining a shortest distance from said second pattern point to any of said street network segments adjacent said second pattern point; and determining said second threshold distance as a multiple of said shortest distance.

8. The method of claim 5, further comprising:

connecting said pattern sections to form said pattern.

9. The method of claim 5, wherein said determining comprises:
creating temporary network segments from said first point to each of said proxy first points along said street network segments in said first set, and from said second point to each of said proxy second points along said street network segments in said second set;
determining said best path from said first point and along any one of said temporary network segments to said proxy first points along said street network segments in said first set to said second point via any one of said temporary network segments to said proxy second points along said street network segments in said second set.

10. The method of claim 6, wherein determining said first threshold distance as a multiple of said shortest distance further comprises:
configuring a minimum threshold
setting said shortest distance to said minimum threshold if said shortest distance is below said minimum threshold.

11. The method of claim 7, determining said second threshold distance as a multiple of said shortest distance further comprises:
configuring a minimum threshold
setting said shortest distance to said minimum threshold if said shortest distance is below said minimum threshold.

12. The method of claim 9, further comprising:
storing a portion of said best path from said proxy first point adjacent said first point to said proxy second point adjacent said second point.

\* \* \* \* \*